(12) United States Patent
Byun

(10) Patent No.: US 10,635,582 B2
(45) Date of Patent: Apr. 28, 2020

(54) MEMORY SYSTEM FOR SELECTING SOURCE MEMORY BLOCK IN GARBAGE COLLECTION AND OPERATING METHOD OF THE SAME

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/862,859

(22) Filed: Jan. 5, 2018

(65) Prior Publication Data
US 2018/0357157 A1 Dec. 13, 2018

(30) Foreign Application Priority Data
Jun. 12, 2017 (KR) .................. 10-2017-0072951

(51) Int. Cl.
*G06F 12/02* (2006.01)
*G06F 3/06* (2006.01)
(52) U.S. Cl.
CPC .......... *G06F 12/0246* (2013.01); *G06F 3/061* (2013.01); *G06F 3/064* (2013.01); *G06F 3/0659* (2013.01); *G06F 3/0679* (2013.01); *G06F 3/0689* (2013.01); *G06F 12/0253* (2013.01); *G06F 2212/7201* (2013.01); *G06F 2212/7205* (2013.01)
(58) Field of Classification Search
None
See application file for complete search history.

(56) References Cited

U.S. PATENT DOCUMENTS

| 8,856,475 | B1 * | 10/2014 | Meir | G06F 12/0253 711/165 |
|---|---|---|---|---|
| 2015/0012671 | A1 * | 1/2015 | Park | G06F 1/3268 710/5 |
| 2015/0324284 | A1 * | 11/2015 | Kim | G06F 12/0246 711/103 |
| 2017/0083436 | A1 * | 3/2017 | Jung | G06F 12/0246 |
| 2018/0188956 | A1 * | 7/2018 | CR | G06F 3/061 |
| 2018/0189187 | A1 * | 7/2018 | Cheung | G06F 3/0604 |

FOREIGN PATENT DOCUMENTS

| KR | 101278591 | 6/2013 |
|---|---|---|
| KR | 1020130142103 | 12/2013 |
| KR | 101604949 | 3/2016 |
| KR | 1020160044989 | 4/2016 |

\* cited by examiner

*Primary Examiner* — Charles Rones
*Assistant Examiner* — Jonah C Krieger
(74) *Attorney, Agent, or Firm* — IP & T Group LLP

(57) ABSTRACT

A memory system includes: a memory device suitable for including a plurality of pages where data are stored and a plurality of memory blocks including the pages; and a controller suitable for receiving a plurality of commands from a host, performing command operations in response to the commands in the memory blocks, updating map data for the memory blocks according to the command operations being performed, and registering information on the map data in a data table for each of the memory blocks.

12 Claims, 13 Drawing Sheets

MEMORY SYSTEM FOR SELECTING SOURCE MEMORY BLOCK IN GARBAGE COLLECTION AND OPERATING METHOD OF THE SAME

CROSS-REFERENCE TO RELATED APPLICATIONS

The present application claims priority of Korean Patent Application No. 10-2017-0072951, filed on Jun. 12, 2017, which is incorporated herein by reference in its entirety.

BACKGROUND

1. Field

Exemplary embodiments of the present invention relate to a memory system, and more particularly, to a memory system for processing data by using a memory device, and a method for operating the memory system.

2. Description of the Related Art

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments are directed to a memory system with minimized complexity and performance deterioration thereof and for maximizing use efficiency of a memory device, and an operating method thereof.

In accordance with an embodiment of the present invention, a memory system includes: a memory device suitable for including a plurality of pages where data are stored and a plurality of memory blocks including the pages; and a controller suitable for receiving a plurality of commands from a host, performing command operations in response to the commands in the memory blocks, updating map data for the memory blocks according to the command operations being performed, and registering information on the map data in a data table for each of the memory blocks.

The controller may check out the map data for the memory blocks and the information registered in the data table, select source memory blocks among the memory blocks of the memory device, and copy and store valid data stored in the source memory blocks into target memory blocks among the memory blocks of the memory device.

The controller may calculate loading time and scanning time of the map data for the memory blocks based on the information registered in the data table and selects first memory blocks having a least loading time and a least scanning time as the source memory blocks among the memory blocks of the memory device.

The controller may register the number of map segments included in the map data of each of the memory blocks, a map segment list of the map segments, and the number of valid addresses included in each of the map segments in the data table for each of the memory blocks.

The controller may calculate the loading time and the scanning time based on the number of the map segments included in the map data of each of the memory blocks, the map segment list of the map segments, and the number of the valid addresses included in each of the map segments, and wherein the map data, the map segments, and the valid addresses of the first memory blocks may have a least size, and the first memory blocks may have a valid addresses distribution of a maximal locality distribution or continuity/sequence distribution.

The controller may load the map data for the first memory blocks in a memory included in the controller, and detect the valid pages from pages included in the first memory blocks by scanning the map segments included in the map data of the first memory blocks.

The controller may copy and store the valid data stored in the valid pages of the first memory blocks into pages included in the target memory blocks.

The first memory blocks may be included in at least one group selected from a group including memory block groups of memory blocks belonging to a first memory die and a second memory die among a plurality of memory dies that are included in the memory device, memory block groups of memory blocks belonging to a first plane and a second plane among a plurality of planes that are included in the first memory die, and memory block groups included only in the first plane.

The controller may register information of map data for the memory block groups in the data table for each memory block group.

The controller may detect a Valid Page Count (VPC) included in each of the memory blocks from a valid page bitmap for the memory blocks, and select the source memory blocks based on the VPC of each of the memory blocks.

In accordance with another embodiment of the present invention, a method for operating a memory system, the method comprising: receiving a plurality of commands for a memory device including a plurality of pages where data are stored and a plurality of memory blocks including the pages from a host; performing command operations to the memory blocks; updating map data for the memory blocks according to the performed command operations; and registering information on the map data in a data table for each of the memory blocks.

The method may further include: checking the map data for the memory blocks and the information registered in the data table, and selecting source memory blocks among the memory blocks of the memory device; and copying and storing valid data stored in the source memory blocks into target memory blocks among the memory blocks of the memory device.

The checking of the map data for the memory blocks and the information registered in the data table, and the selecting of the source memory blocks among the memory blocks of the memory device may include: calculating loading time and scanning time of the map data for the memory blocks based on the information registered in the data table; and selecting first memory blocks having a least loading time and a least scanning time as the source memory blocks among the memory blocks of the memory device.

In the registering of the information on the map data in the data table for each of the memory blocks, the number of map segments included in the map data of each of the memory blocks, a map segment list of the map segments, and the number of valid addresses included in each of the map segments may be registered in the data table for each of the memory blocks.

In the calculating of the loading time and the scanning time of the map data for the memory blocks based on the information registered in the data table, the loading time and the scanning time may be calculated based on the number of the map segments included in the map data of each of the memory blocks, the map segment list of the map segments, and the number of the valid addresses included in each of the map segments, and wherein the map data, the map segments, and the valid addresses of the first memory blocks may have a least size, and the first memory blocks may have a valid addresses distribution of a maximal locality distribution or continuity/sequence distribution.

The copying and storing of the valid data stored in the source memory blocks into the target memory blocks among the memory blocks of the memory device may further include: loading the map data for the first memory blocks in a memory included in the controller; and detecting the valid pages from pages included in the first memory blocks by scanning the map segments included in the map data of the first memory blocks.

In the copying and storing of the valid data stored in the source memory blocks into the target memory blocks among the memory blocks of the memory device, the valid data stored in the valid pages of the first memory blocks may be copied and stored into pages included in the target memory blocks.

The first memory blocks may be included in at least one group selected from a group including memory block groups of memory blocks belonging to a first memory die and a second memory die among a plurality of memory dies that are included in the memory device, memory block groups of memory blocks belonging to a first plane and a second plane among a plurality of planes that are included in the first memory die, and memory block groups included only in the first plane.

The registering of the information on the map data in the data table for each of the memory blocks may further include: registering information of map data for the memory block groups in the data table for each memory block group.

The checking of the map data for the memory blocks and the information registered in the data table, and the selecting of the source memory blocks among the memory blocks of the memory device may further include: detecting a Valid Page Count (VPC) included in each of the memory blocks from a valid page bitmap for the memory blocks; and selecting the source memory blocks based on the VPC of each of the memory blocks.

In accordance with another embodiment of the present invention, a memory system, comprising: a plurality of memory blocks; and a controller suitable for selecting among the memory blocks a source memory block having the least loading time of corresponding map data and the least scanning time of loaded map data, and controlling a garbage collection operation to the memory blocks with the selected source memory block, wherein the controller determines the least loading time and the least scanning time based on a size of map data, a number of valid addresses included in the map data, and locality distribution of the valid addresses.

DETAILED DESCRIPTION

Figure 1:
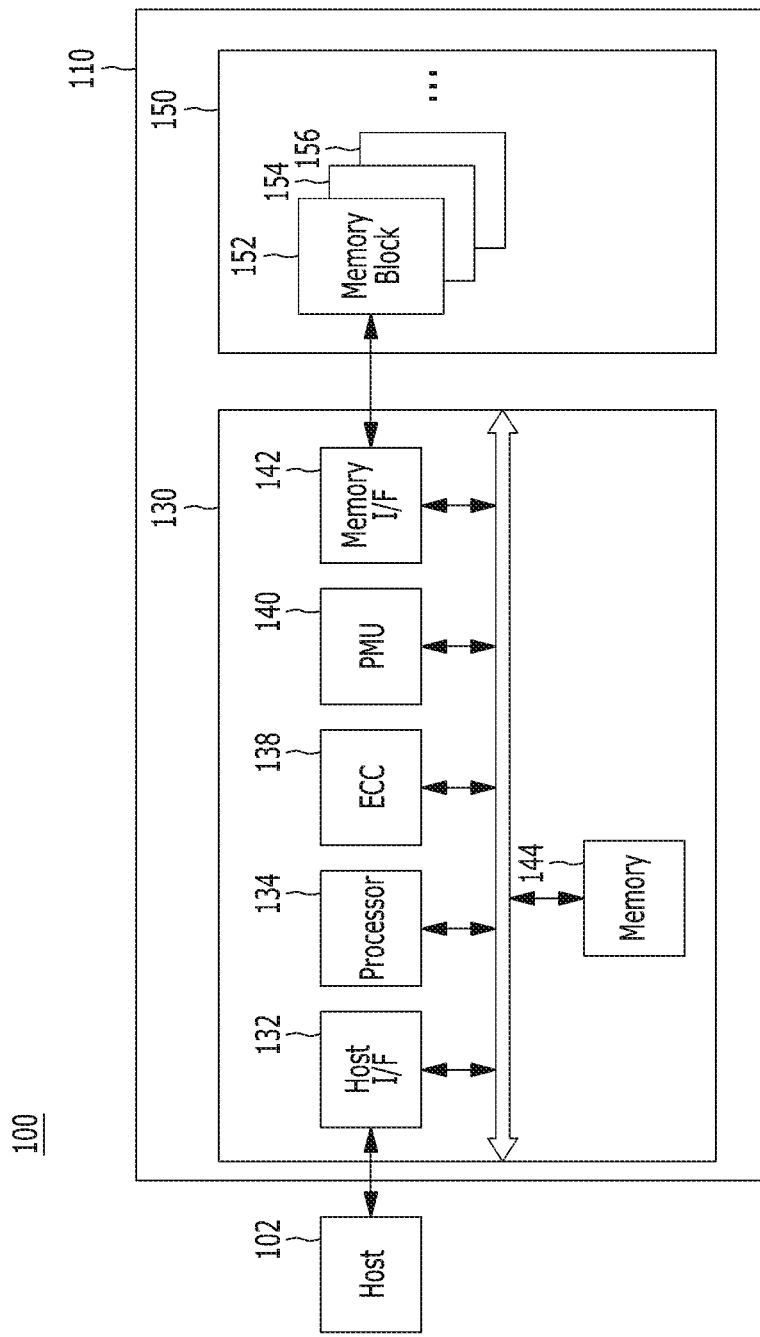
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies, each memory die including a plurality of planes, each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a memory I/F (such as a NAND flash controller (NFC)) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
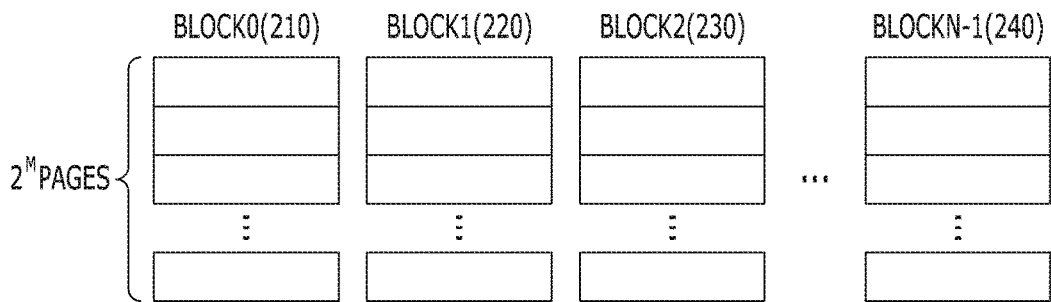
FIG. 2 is a schematic diagram illustrating an exemplary configuration of a memory device employed in the memory system of FIG. 1.

FIG. 2 is a schematic diagram illustrating the memory device 150.

Referring to FIG. 2, the memory device 150 may include a plurality of memory blocks 0 to N-1, and each of the blocks 0 to N-1 may include a plurality of pages, for example, $2^M$ pages, the number of which may vary according to circuit design. Memory cells included in the respective memory blocks 0 to N-1 may be one or more of a single level cell (SLC) storing 1-bit data, a multi-level cell (MLC) storing 2-bit data, a triple level cell (TLC) storing 3-bit data, a quadruple level cell (QLC) storing 4-bit level cell, a multiple level cell storing 5-or-more-bit data, and so forth.

Figure 3:
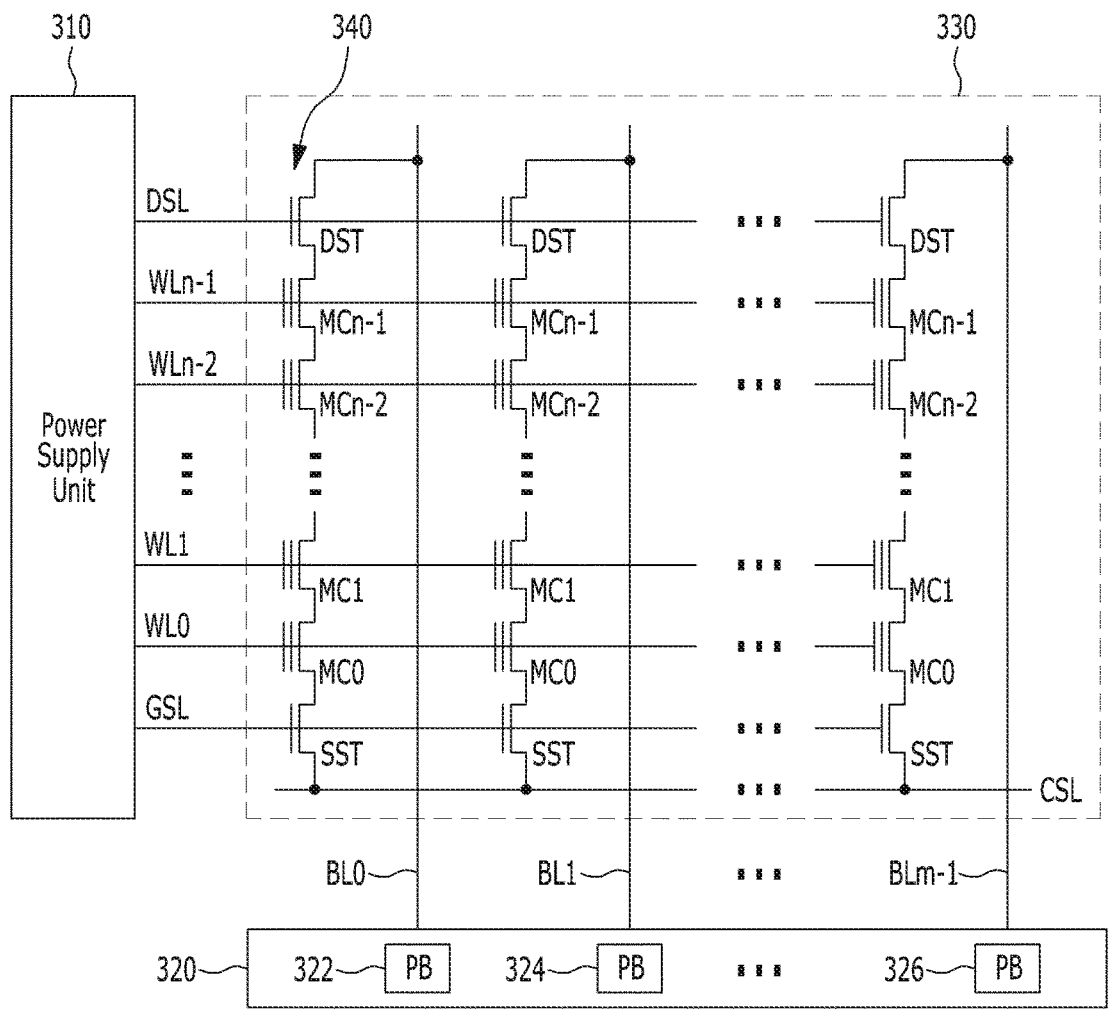
FIG. 3 is a circuit diagram illustrating an exemplary configuration of a memory cell array of a memory block in the memory device of FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 of the memory system 110 may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
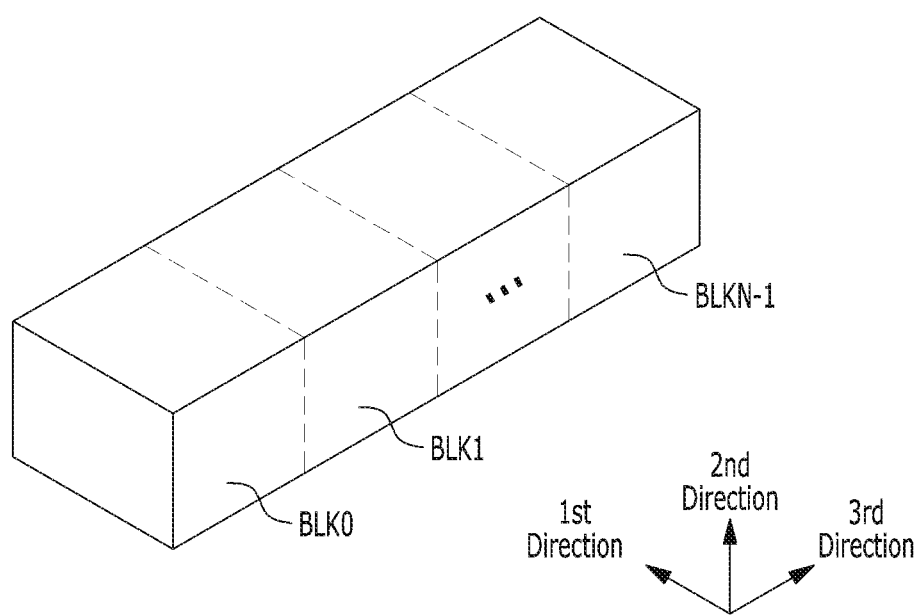
FIG. 4 is a schematic diagram illustrating an exemplary three-dimensional structure of the memory device of FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

FIGS. 5 to 8 illustrate an operation example of the memory system 110.

Metadata may correspond to a program operation and include a first map data including logical-to-physical (L2P) information (which is referred to as 'logical information', hereafter) and for data stored in memory blocks, and a second map data including physical-to-logical (P2L) information (which is referred to as 'physical information', hereafter) for the data stored in the memory blocks. Also, the metadata may include information on the command data corresponding to a command received from the host 102, information on the command operation corresponding to the command, information on the memory blocks of the memory device 150 onto which the command operation is performed, and information on the map data corresponding to the command operation.

Figure 5:
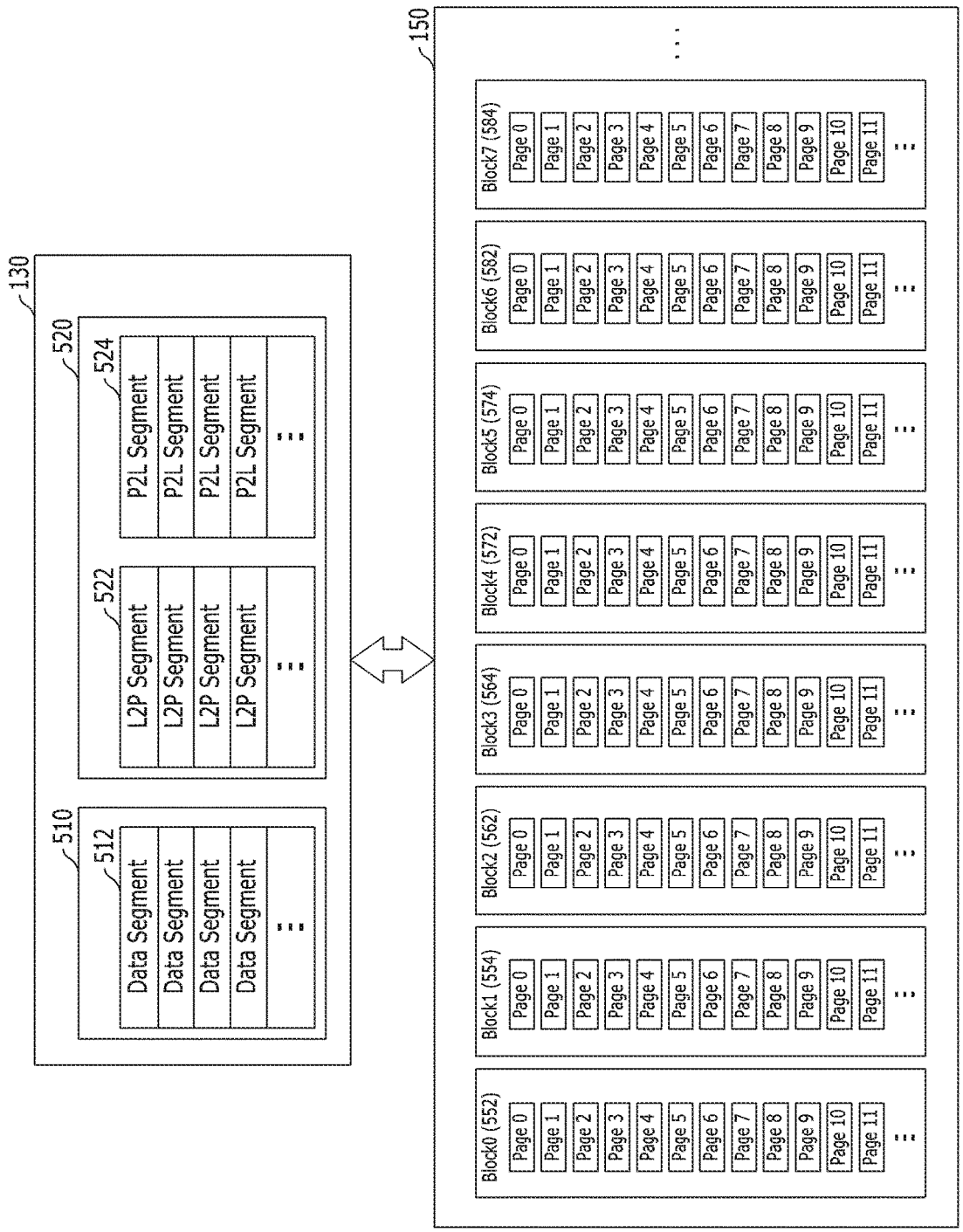
FIGS. 5 to 8 illustrate an operation example of the memory system of FIG. 1.

Referring to FIG. 5, the controller 130 may perform command operations in response to a plurality of commands, for example, the controller 130 may perform program operations in response to a plurality of write commands. Herein, the controller 130 may program and store user data in memory blocks 552 to 584, and also, the controller 130 may generate and update metadata for the user data according to the program operations and store the generated and updated metadata in the memory blocks 552 to 584.

Herein, the controller 130 may generate and update information representing that the user data are stored in the pages included in the memory blocks. In other words, the controller 130 may generate and update logical segments of the first map data, i.e., L2P segments, and physical segments of the second map data, i.e., P2L segments. The controller 130 then may store the generated and updated information in the pages included in the memory blocks 552 to 584.

For example, the controller 130 may cache and buffer the user data in a first buffer 510 which is included in the memory 144, in other words, the controller 130 may store data segments 512 of the user data in the first buffer 510, which is a data buffer/cache, and then store the data segments 512 stored in the first buffer 510 in the pages included in the memory blocks 552 to 584.

As the data segments 512 of the user data corresponding to the write commands are programmed and stored in the pages included in the memory blocks 552 to 584, the controller 130 may generate and update the first map data and the second map data and store the generated and updated first and second map data in a second buffer 520 included in the memory 144. In other words, the controller 130 may store L2P segments 522 of the first map data and P2L segments 524 of the second map data for the user data in the second buffer 520, which is a map buffer/cache. Herein, as described above, the L2P segments 522 of the first map data and the P2L segments 524 of the second map data, or a map list for the L2P segments 522 of the first map data and a map list for the P2L segments 524 of the second map data may be stored in the second buffer 520. Also, the controller 130 may store the L2P segments 522 of the first map data and the P2L segments 524 of the second map data that are stored in the second buffer 520 in the pages included in the memory blocks 552 to 584.

Also, the controller 130 may perform command operations in response to a plurality of commands, for example, perform read operations in response to a plurality of read commands. Herein, the controller 130 may load and detect the map segments of the user data corresponding to the read commands, for example, the L2P segments 522 of the first map data and the P2L segments 524 of the second map data, in the second buffer 520, and then read the user data that are stored in the pages of the corresponding memory blocks among the memory blocks 552 to 584, store the data segments 512 of the read user data in the first buffer 510, and transfer them to the host 102.

Also, the controller 130 may perform command operations in response to a plurality of commands, for example, perform erase operations in response to a plurality of erase commands. Herein, the controller 130 may detect memory blocks in response to the erase commands among the memory blocks 552 to 584, and perform the erase operations onto the detected memory blocks.

When the controller 130 performs a background operation, for example, an operation of copying data or swapping data among the memory blocks included in the memory device 150, such as a garbage collection operation or a wear-leveling operation, the controller 130 may store the data segments 512 of the corresponding user data in the first buffer 510 and also store the map segments 522 and 524 of the map data corresponding to the user data in the second buffer 520 and perform a garbage collection operation or a wear-leveling operation.

Figure 6:
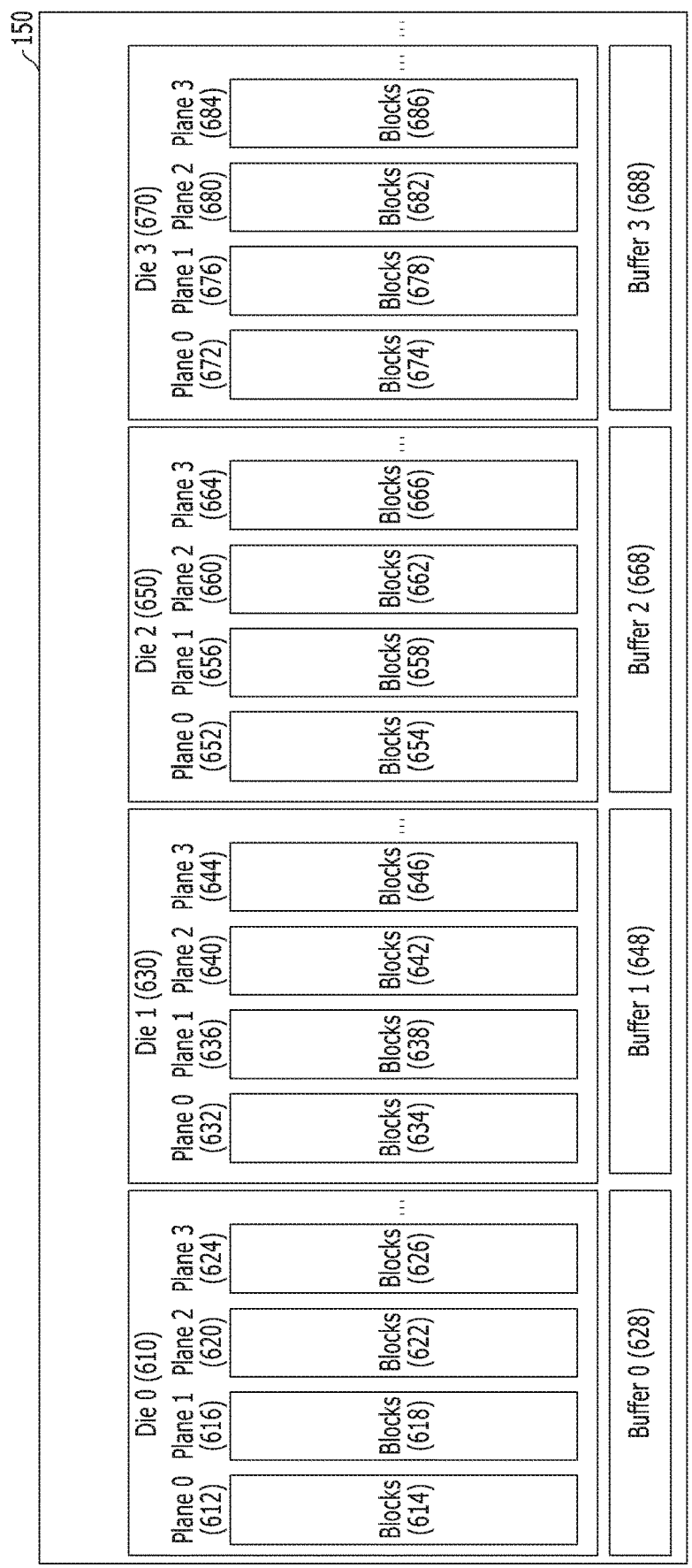

Also, referring to FIG. 6, the memory device 150 may include a plurality of memory dies, and each of the memory dies may include a plurality of planes. The planes may include a plurality of memory blocks. Also, the memory device 150 may include a plurality of buffers respectively corresponding to the memory dies.

The memory blocks may be grouped into a plurality of super memory blocks, and the command operations may be performed in the super memory blocks.

When the memory blocks include invalid pages, a garbage collection operation may be performed onto the memory blocks to maximize the usage efficiency. Herein, the controller 130 may detect valid pages in the memory blocks and then perform a garbage collection operation based on the parameters of the memory blocks, e.g., the Valid Page Count (VPC), and generate empty memory blocks, open memory blocks, or free memory blocks.

The controller 130 may select source memory blocks among the memory blocks, and copy and store the valid data stored in the valid pages of the source memory blocks in the pages of target memory blocks in consideration of the parameters for the memory blocks. Herein, the controller 130 may select empty memory blocks, open memory blocks, or free memory blocks among the memory blocks as target memory blocks. When garbage collection operations are performed onto the memory blocks, the controller 130 then may read the map segments for the memory blocks from the memory blocks and then perform an operation of loading the read map segments into the memory 144, and an operation of scanning the map segments that are loaded into the memory 144, i.e., an operation of scanning the map segments, and perform a copy operation and an erase operation for the selected source memory blocks to detect valid pages and select the source memory blocks among the memory blocks.

Herein, when the garbage collection operation is performed, the controller 130 may check out processing time of the memory blocks, which is the parameter for the memory blocks, and select the source memory blocks among the memory blocks in consideration of the processing time. Herein, the processing time may be operating time taken for the garbage collection operation preformed on the memory blocks.

The processing time may include loading time taken for performing the operation of loading the map segments for the memory blocks, scanning time taken for performing the operation of scanning the loaded map segments, copying time taken for performing a copy operation onto the memory blocks, and erasing time taken for performing an erase operation. The loading time and the scanning time may be decided based on the number of map segments for each memory block, the number of valid addresses included in each map segment, e.g., the number of L2P segments, the number of valid physical addresses included in each L2P segment, the number of P2L segments, the number of valid logical addresses included in each P2L segment, e.g., the number of Logical Block Addresses (LBA). Herein, the valid addresses may be addresses for the valid pages included in each memory block or addresses for the valid data stored in the valid pages. Also, the copying time may be decided based on the number of valid pages included in each memory block, in other words, the size of the valid data.

In short, when a garbage collection operation is performed in the memory system 110, the controller 130 may check out the processing time of each memory block, which is affected by the size of the valid data in each memory block, e.g., the number of valid pages, and the size of map data, e.g., the number of map segments and the number of valid addresses included in each map segment. The controller 130 may select the source memory blocks among the memory blocks in consideration of the parameter (i.e., the processing time) for each of the memory blocks, copy and store the valid data of the source memory blocks into target memory blocks, and then perform an erase operation onto the source memory blocks.

Figure 7:
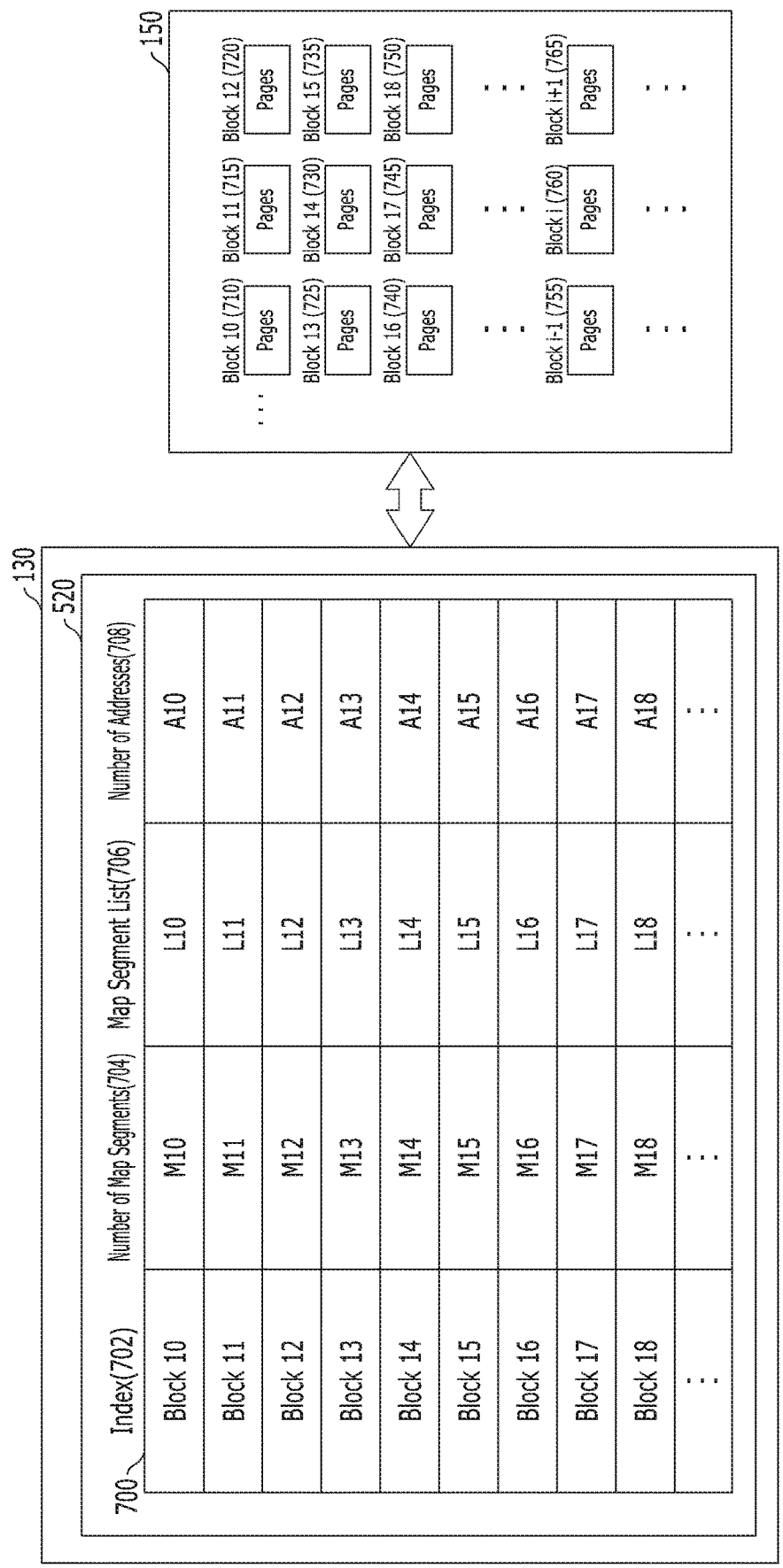

Referring to FIG. 7, the controller 130 may write and store the user data corresponding to a plurality of write commands into the pages included in memory blocks, e.g., memory blocks 710 to 750.

When the controller 130 performs a garbage collection operation onto the memory blocks, the controller 130 may select the source memory blocks among the memory blocks in consideration of not only the number of the valid pages included in the memory blocks, e.g., the VPC for the memory blocks, but also the loading time taken for performing a load operation of loading the map data for each memory block into the memory 144 and the scanning time taken for performing a scan operation of scanning the map data loaded into the memory 144, and copy and store the valid data stored in the valid pages of the source memory blocks into the pages of the target memory blocks.

Herein, the loading time and the scanning time of the map data for the memory blocks may be affected by the number of map segments for each memory block, the number of valid addresses included in each map segment, e.g., the number of L2P segments, the number of valid physical addresses included in each L2P segment, the number of P2L segments, the number of valid logical addresses included in each P2L segment, e.g., the number of Logical Block Addresses (LBA). Herein, the valid addresses may be addresses for the valid pages included in each memory block or addresses for the valid data stored in the valid pages, which is described earlier.

The controller 130 may select the best source memory blocks from the memory blocks in consideration of not only the VPC of each memory block through a valid page bitmap but also the loading time and scanning time of the map data for the memory blocks based on a data table 700 by generating the valid page bitmap corresponding to the valid pages of each memory block and registering information on the map data for the memory blocks in the data table 700.

Particularly, the controller 130 may register the information on the map data in the data table 700 when the map data for the memory blocks are updated. Herein, the controller 130 may register the number 704 of the map segments for each memory block, a map segment list 706, and the number 708 of the addresses included in each map segment in the data table 700 for each of indices 702 indicating the memory blocks. The controller 130 may check out the loading time and scanning time of the map segments for each memory block based on the number 704 of the map segments for each memory block, the map segment list 706, and the number 708 of the addresses included in each map segment that are registered in the data table 700, and then select the best source memory blocks in consideration of the loading time and scanning time of the map data, and perform the garbage collection operation quickly and efficiently at a low cost.

The controller 130 may register the information on the map data for the memory blocks, e.g., the memory blocks 710 to 750, in the data table 700. Herein, the data table 700 may be stored in the second buffer 520.

For example, when the map data for the memory blocks 720 and 735 are updated, the controller 130 may count the number of the map segments of the map data for the memory blocks 720 and 735 and then register the information representing that the number of the map segments of the map data for the memory blocks 720 and 735 are M12 and M15 in the number 704 of the map segments of the data table 700 for the indices 702 of the memory blocks 720 and 735.

For example, when the map data for the memory blocks 720 and 735 are updated, the controller 130 may register a map segment list L12 and a map segment list L15 corresponding to the numbers of the map segments of the memory blocks 720 and 735, which are M12 and M15, registered in the number 704 of the map segments of the data table 700 in the map segment lists 706 according to the indices 702 of the memory blocks 720 and 735.

Also, the number 708 of the addresses in the data table 700 may represent the number of the addresses that are respectively included in the map segments of the map data for the memory blocks 710 to 750 according to the indices 702 of the memory blocks 710 to 750. Herein, as described earlier, while the update operation of the map data for the memory blocks 710 to 750 is performed, the controller 130 may register the number of the addresses that are included in the map segments of the map data corresponding to the memory blocks 710 to 750, e.g., the L2P segments of the first map data and the P2L segments of the second map data, in the number 708 of the addresses of the data table 700. Particularly, the controller 130 may count the numbers of the valid addresses included in the map segments for the map data of the memory blocks 710 to 750, that is, the number of the valid physical addresses included in the L2P segments and the valid logical addresses included in the P2L segments, and register the information representing the counted numbers of the valid addresses of the map segments for the map data of the memory blocks 710 to 750 in the number 708 of the addresses of the data table 700. For example, while the map data for the memory blocks 720 and 735 are updated, the controller 130 may count the number of the valid addresses included in the map segments for the map data of the memory blocks 720 and 735, and register the information representing the counted numbers of the valid addresses of the map segments for the map data of the memory blocks 720 and 735 are A12 and A15 in the number 708 of the addresses of the data table 700 according to the according to the indices 702 of the memory blocks 720 and 735.

When the controller 130 performs a garbage collection operation for the memory blocks included in the memory device 150, the controller 130 may select the source memory blocks from the memory blocks in consideration of not only the VPC of each memory block through a valid page bitmap but also the loading time and scanning time of the map data for the memory blocks based on a data table 700 where the information of the map data for the memory blocks is registered, which is described above.

Particularly, the controller 130 may check out the loading time of the map data for each memory block based on the number 704 of the map segments and the map segment list 706 for each memory block from the data table 700, and also, check out the scanning time of the map data for each memory block based on the number 704 of the map segments, the map segment list 706, and the number 708 of the addresses for each memory block from the data table 700.

Also, the controller 130 may select the source memory blocks among the memory blocks in consideration of the loading time and scanning time of the map data for each memory block. Herein, the controller 130 may select one or more memory blocks having the least loading time and scanning time as the best source memory blocks among the memory blocks or select one or more super memory blocks having the least loading time and scanning time as the best source memory blocks among the super memory blocks. For the sake of convenience in description, in this embodiment of the present invention, a case where one memory block having the least loading time and scanning time, e.g., the memory block 735, is selected as the best source memory block among the memory blocks will be taken as an example and described by referring to FIG. 8.

Figure 8:
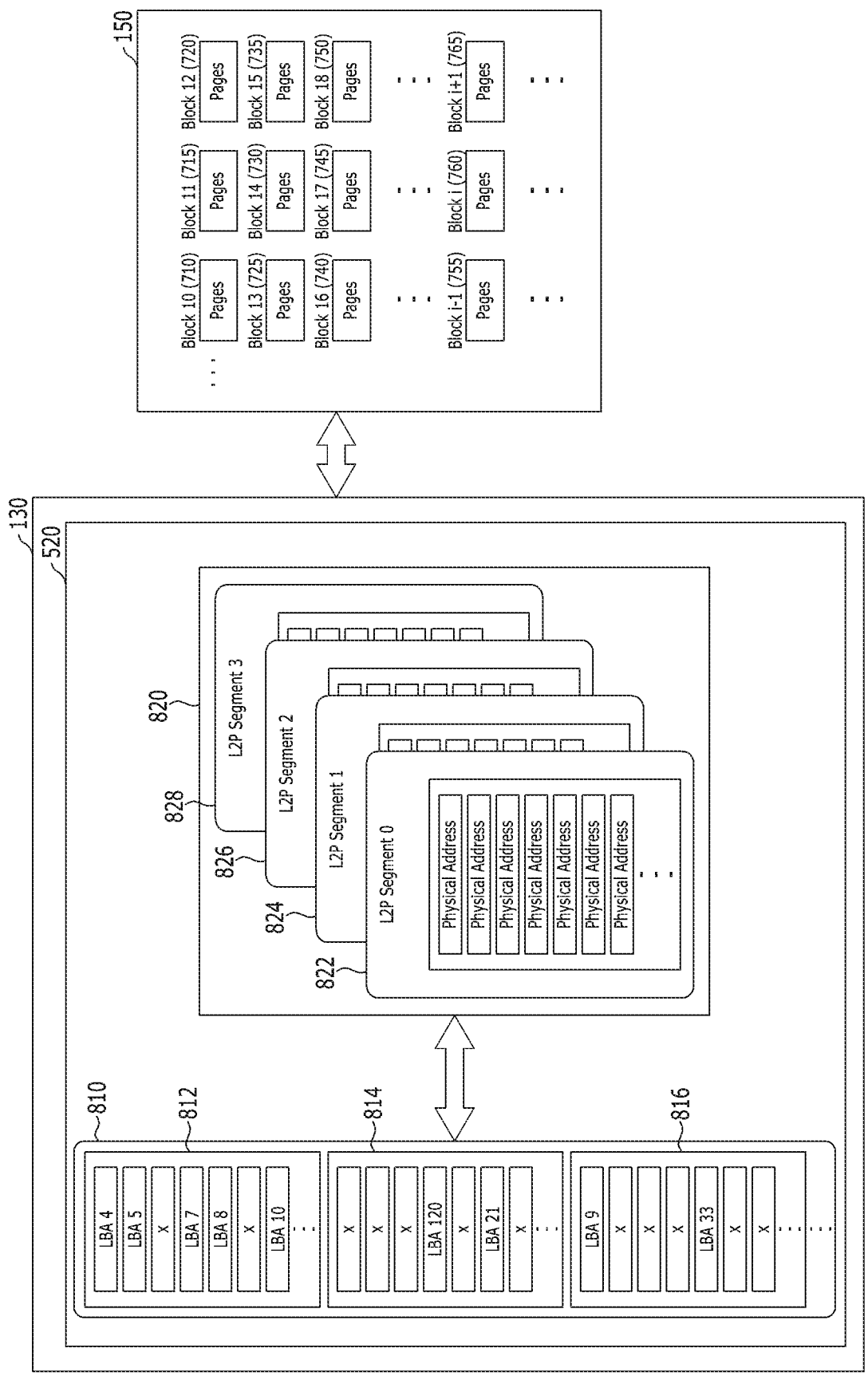

Referring to FIG. 8, the controller 130 may check out the size of the map data or map segments and the size and distribution of the valid addresses included in the map data or map segments from the number 704 of the map segments, the map segment list 706, and the number 708 of the addresses of the data table 700. The controller 130 may select the memory block 735, which has the least size of map data or map segments, the least size of valid addresses, and the maximal locality distribution or continuity/sequence distribution of the valid addresses as the best source memory block. Herein, as described above, it may be seen from the number 704 of the map segments of the map data for the memory block 735, the map segment list 706, and the number 708 of the addresses of the data table 700 that the memory block 735 which is selected as the best source memory block may have the least size of map data or map segments, the least size of valid addresses, and the maximal locality distribution or continuity/sequence distribution of the valid addresses, the memory block 735 becomes the memory block having the least loading time and scanning time among the memory blocks included in the memory device 150. Therefore, the memory block 735 becomes the best source memory block.

Also, the controller 130 may load the map data, e.g., first map data 820 and second map data 810, for the memory block 735 which is selected as a source memory block in the second buffer 520 included in the memory 144. In short, the controller 130 may perform a loading operation of the map data for the memory block 735. Also, the controller 130 may scan the map data between the first map data 820 and the second map data 810 that are loaded in the second buffer 520. In short, the controller 130 may perform a scanning operation of the map data for the memory block 735.

Herein, the controller 130 may load L2P segments 822 to 828 of the first map data 820 and P2L segments 812 to 816 of the second map data 810 for the memory block 735 in the second buffer 520, and detect valid pages included in the memory block 735 by scanning the physical addresses included in the L2P segments 822 to 828 of the first map data 820 and the logical addresses included in the P2L segments 812 to 816 of the second map data 810, e.g., Logical Block Addresses (LBA).

To be specific, the controller 130 may detect the valid pages included in the memory block 735 by comparing the valid physical addresses of the L2P segments 822 to 828 loaded in the second buffer 520 with the valid logical addresses of the P2L segments 812 to 816 also loaded in the second buffer 520.

Also, the controller 130 may copy and store the valid data stored in the valid pages of the memory block 735 in the pages included in a target memory block, e.g., a memory block 760, in other words, the controller 130 may perform a copy operation for the valid data of the memory block 735, and then perform an erase operation onto the memory block 735 whose valid data are copied.

Figure 9:
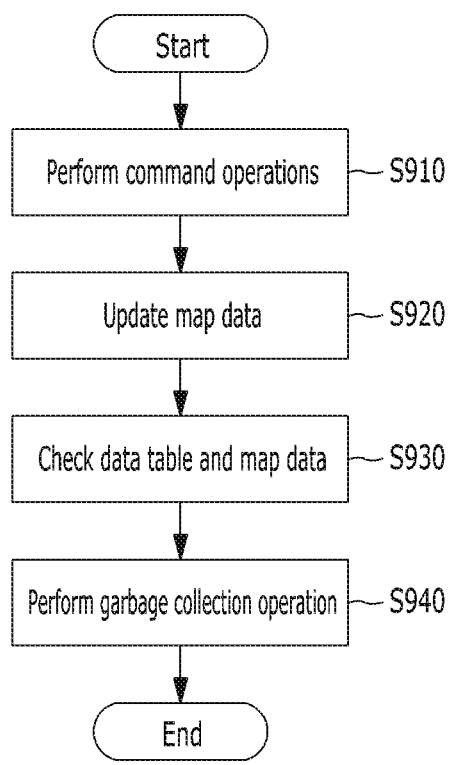
FIG. 9 is a flowchart illustrating an operation of the memory system of FIG. 1.

FIG. 9 is a flowchart illustrating an operation of the memory system 110.

Referring to FIG. 9, in step S910, the memory system 110 may perform command operations in response to a plurality of commands. For example, the memory system 110 may perform program operations in response to a plurality of write commands.

In step S920, map data for the memory blocks may be updated according to the performance of the command operations. Herein, when the map data are updated, information on the map data for the memory blocks, e.g., the number of map segments for each memory block, a list of the map segments, and the number of addresses included in each map segment, may be registered in the data table 700.

In step S930, the data table for the memory blocks and the map data are checked, and source memory blocks may be selected among the memory blocks.

In step S940, valid data stored in the source memory blocks may be copied and stored into target memory blocks, and then an erase operation may be performed onto the source memory blocks. In short, a garbage collection operation may be performed for the memory blocks.

Herein, since the processes of quickly selecting the best source memory blocks among the memory blocks at a low cost by using the data table 700 and then copying and storing the valid data stored in the source memory blocks are described above in detail with reference to FIGS. 5 to 8, further description on them will not be provided herein. Hereafter, a data processing system and electronic devices to which the memory system 110 including the memory device 150 and the controller 130, which are described above by referring to FIGS. 1 to 9, in accordance with the embodiment of the present invention is applied will be described in detail with reference to FIGS. 10 to 18.

Figure 10:
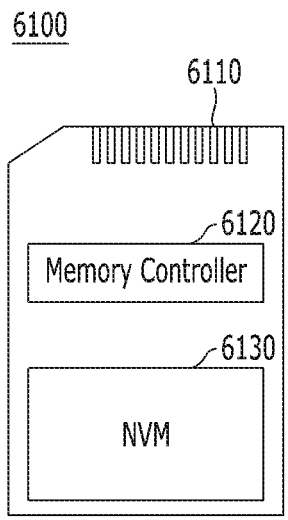
FIGS. 10 to 18 are diagrams schematically illustrating application examples of the data processing system of FIG. 1.

FIG. 10 is a diagram schematically illustrating another example of the data processing system including the memory system in accordance with the present embodiment. FIG. 9 schematically illustrates a memory card system to which the memory system in accordance with the present embodiment is applied.

Referring to FIG. 10, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processing unit, a host interface, a memory interface and an error correction unit.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
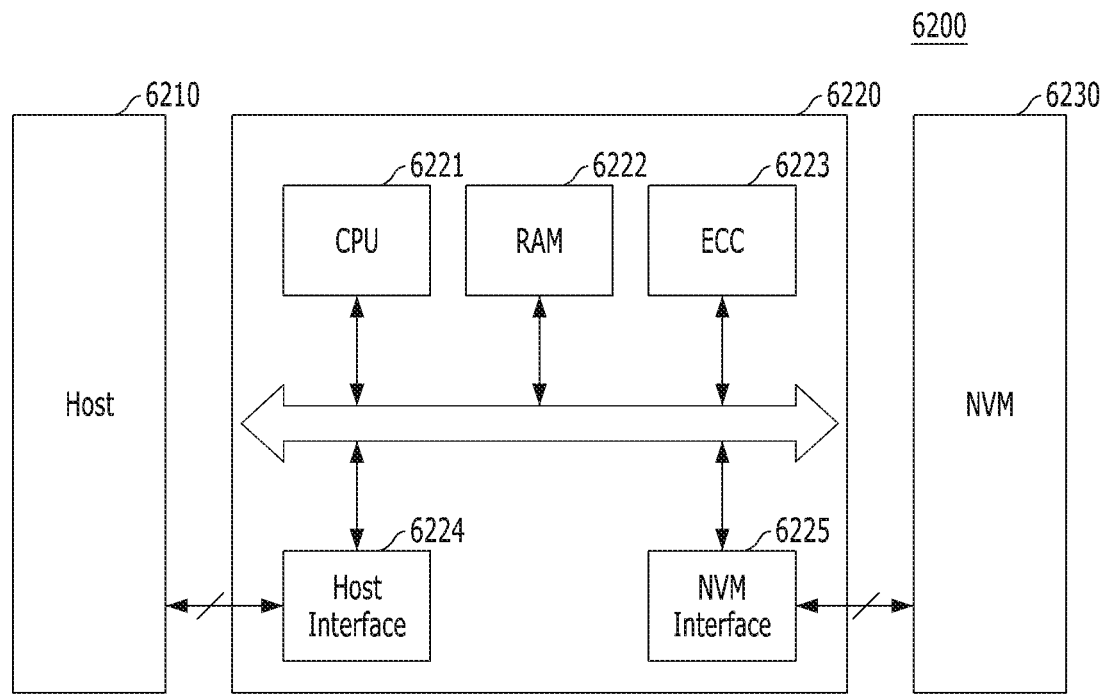

FIG. 11 is a diagram schematically illustrating another example of the data processing system including the memory system in accordance with the present embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 12:
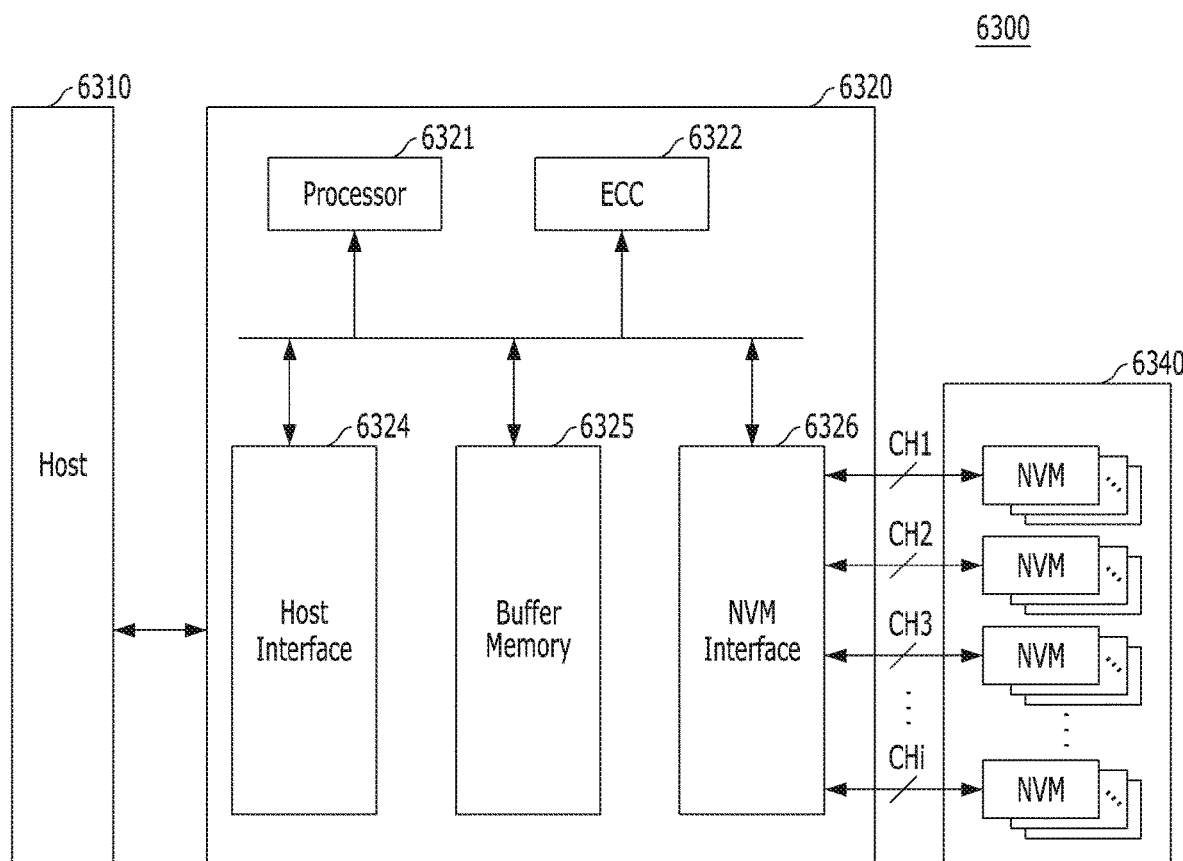

FIG. 12 is a diagram schematically illustrating another example of the data processing system including the memory system in accordance with the present embodiment. FIG. 12 schematically illustrates an SSD to which the memory system in accordance with the present embodiment is applied.

Referring to FIG. 12, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 8 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data in response to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
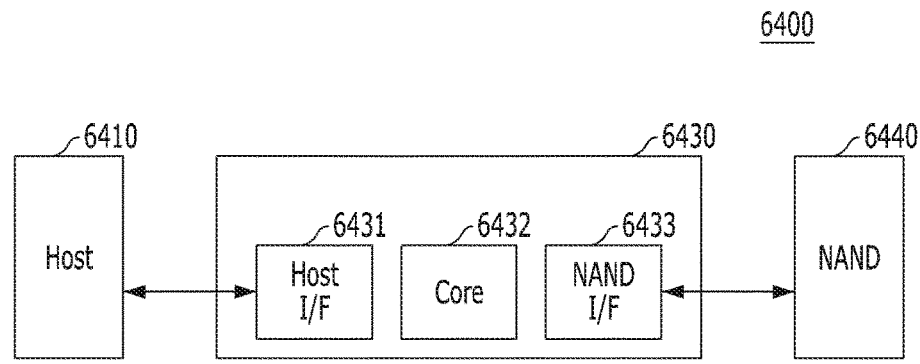

FIG. 13 is a diagram schematically illustrating another example of the data processing system including the memory system in accordance with the present embodiment. FIG. 13 schematically illustrates an embedded Multi-Media Card (eMMC) including the memory system 110.

Referring to FIG. 13, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with the present embodiment. FIGS. 13 to 16 schematically illustrate Universal Flash Storage (UFS) systems including the memory system 110.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI Unified Protocol (UniPro) in Mobile Industry Processor Interface (MIPI). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
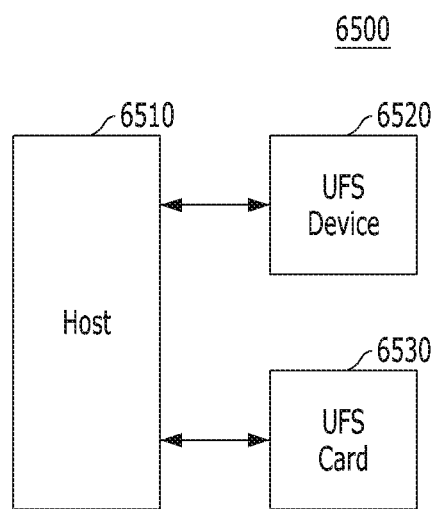

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510.

In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
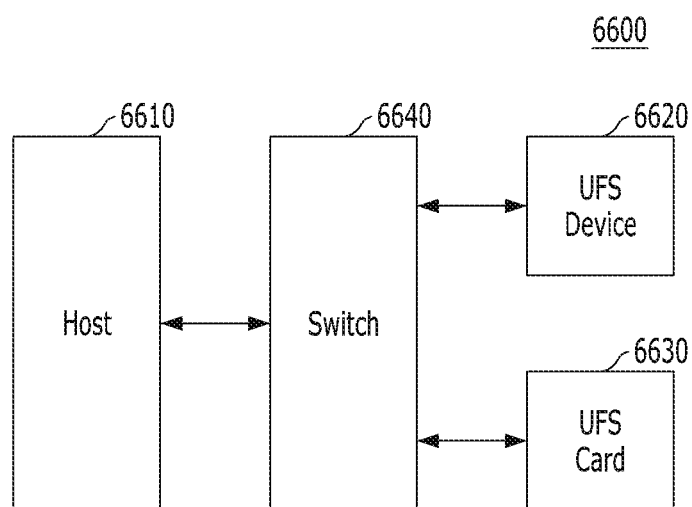

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
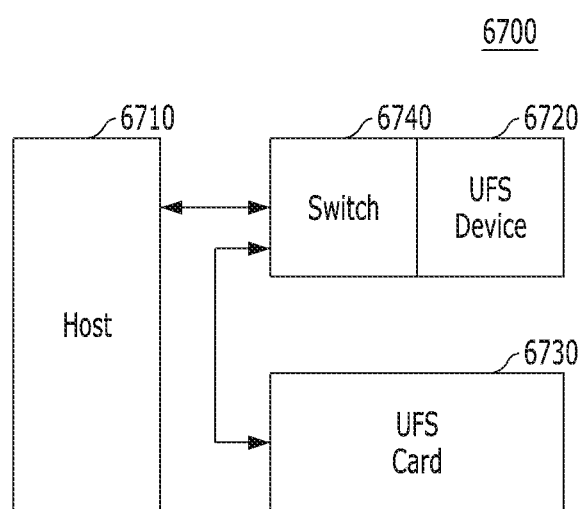

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
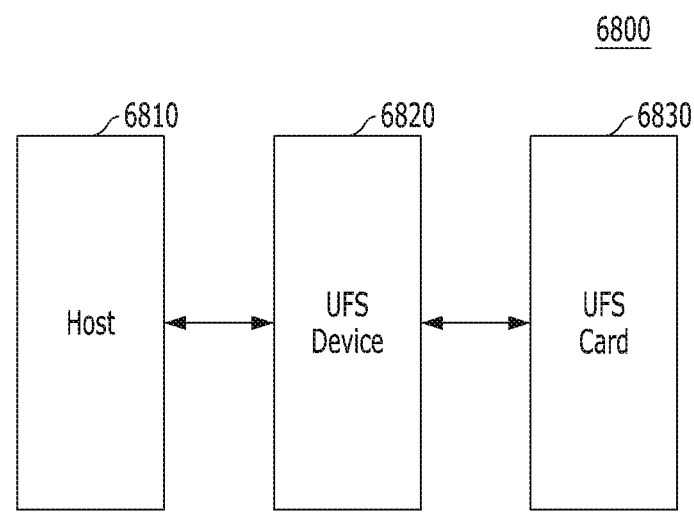

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
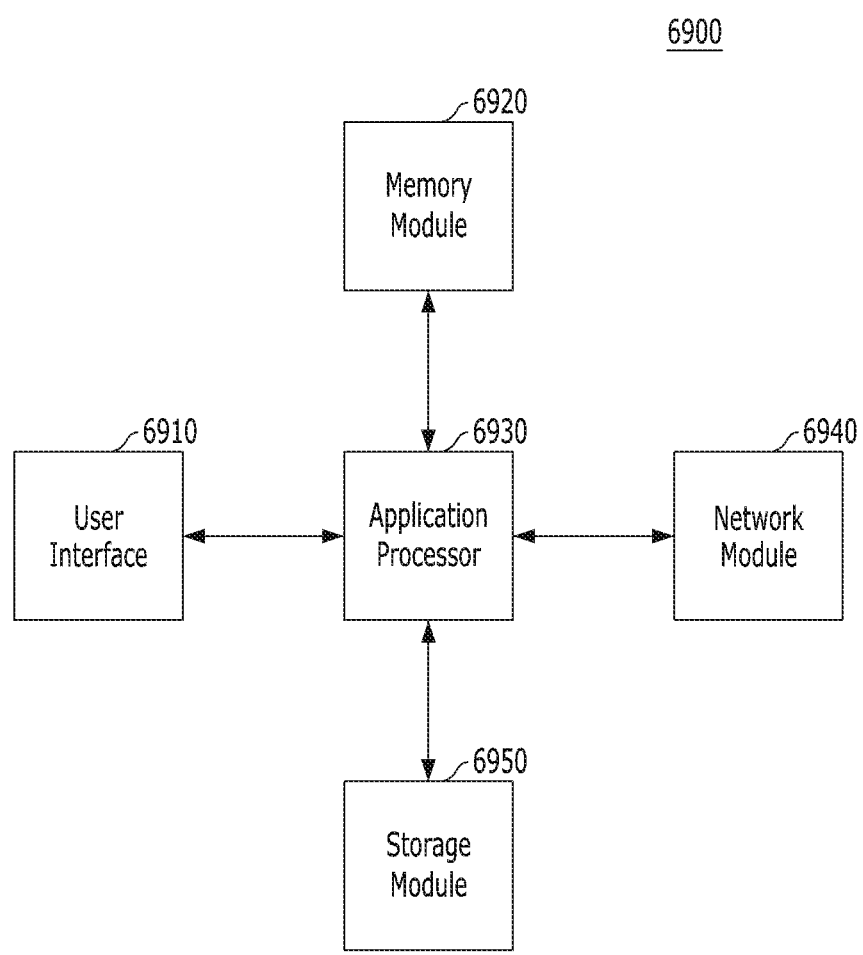

FIG. 18 is a diagram schematically illustrating another example of the data processing system including the memory system in accordance with an embodiment. FIG. 18 is a diagram schematically illustrating a user system including the memory system 110.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments of the present invention, the memory system and the method for operating the memory system may be able to minimize the complexity and performance deterioration of the memory system, maximize the usage efficiency of a memory device, and rapidly and stably process data into a memory device.

While the present invention has been described with respect to the specific embodiments, it will be apparent to those skilled in the art that various changes and modifications may be made without departing from the spirit and scope of the invention as defined in the following claims.

What is claimed is:

1. A memory system, comprising:
  a memory device suitable for including a plurality of pages where data are stored and a plurality of memory blocks including the pages; and
  a controller suitable for receiving a plurality of commands from a host, performing command operations in response to the commands in the memory blocks, updating map data for the memory blocks according to the command operations being performed, and registering a number of map segments included in the map data of each of the memory blocks, a map segment list and a number of valid addresses included in each of the map segments, in a data table for each of the memory blocks,
  wherein the controller selects a source memory block among the memory blocks, having a least loading time of corresponding map data and a least scanning time of loaded map data, based on the data table;
  wherein the controller controls a garbage collection operation by verifying validity of data stored in the selected source memory block and copying valid data to a target memory block;
  wherein the controller verifies the validity of the data by loading the map segments of the selected source memory block and scanning the loaded map segments;
  wherein the controller calculates the loading time and the scanning time based on the number of the map segments included in the map data of each of the memory blocks, the map segment list of the map segments, and the number of the valid addresses included in each of the map segments; and
  wherein the map data, the map segments, and the valid addresses of the source memory block has a least size, and the source memory block has valid address distributions of a maximal locality distribution or continuity/sequence distribution.

2. The memory system of claim 1,
  wherein the controller loads the map data for the source memory block in a memory included in the controller, and detects valid pages from pages included in the source memory block by scanning the map segment list included in the map data of the source memory block.

3. The memory system of claim 2,
  wherein the controller copies and stores the valid data stored in the valid pages of the source memory block into the pages included in the target memory block.

4. The memory system of claim 1,
  wherein the source memory block is included in at least one group selected from a group including memory block groups of memory blocks belonging to a first memory die and a second memory die among a plurality of memory dies that are included in the memory device, memory block groups of memory blocks belonging to a first plane and a second plane among a plurality of planes that are included in the first memory die, and memory block groups included only in the first plane.

5. The memory system of claim 4, wherein the controller registers information of the map data for the memory block groups in the data table for each memory block group.

6. The memory system of claim 1, wherein the controller detects a Valid Page Count (VPC) included in each of the memory blocks from a valid page bitmap for the memory blocks, and selects the source memory block based on the VPC of each of the memory blocks.

7. A method for operating a memory system, the method comprising:
  receiving a plurality of commands for a memory device including a plurality of pages where data are stored and a plurality of memory blocks including the pages from a host; performing command operations to the memory blocks;
  updating map data for the memory blocks according to the performed command operations; and
  registering a number of map segments included in the map data of each of the memory blocks, a map segment list and a number of valid addresses included in each of the map segments, in a data table for each of the memory blocks;
  selecting a source memory block among the memory blocks, having a least loading time of corresponding map data and a least scanning time of loaded map data, based on the data table; and
  controlling a garbage collection operation by verifying validity of data stored in the selected source memory block and copying valid data to a target memory block,
  wherein the verifying the validity of the data includes loading the map segments of the selected source memory block and scanning the loaded map segments;
  wherein, in the selecting of the source memory block, the loading time and the scanning time are calculated based on the number of the map segments included in the map data of each of the memory blocks, the map segment list, and the number of the valid addresses included in each of the map segments; and
  wherein the map data, the map segments, and the valid addresses of the source memory block has a least size, and the source memory block has valid address distributions of a maximal locality distribution or continuity/sequence distribution.

8. The method of claim 7,
  wherein the controlling of the garbage collection operation further includes:
  loading the map data for the source memory block in a memory included in a controller; and detecting valid pages from pages included in the source memory block by scanning the map segment list included in the map data of the source memory block.

9. The method of claim 8, wherein in the controlling the garbage collection operation, the valid data stored in the valid pages of the source memory block are copied and stored into the pages included in the target memory block.

10. The method of claim 7, wherein the source memory block is included in at least one group selected from a group including memory block groups of memory blocks belonging to a first memory die and a second memory die among a plurality of memory dies that are included in the memory device, memory block groups of memory blocks belonging to a first plane and a second plane among a plurality of planes that are included in the first memory die, and memory block groups included only in the first plane, and
wherein the selecting of the source memory block further includes:
detecting a Valid Page Count (VPC) included in each of the memory blocks from a valid page bitmap for the memory blocks; and
selecting the source memory blocks based on the VPC of each of the memory blocks.

11. The method of claim 10, wherein the registering of the number of map segments included in the map data of each of the memory blocks, the map segment list and the number of the valid addresses included in each of the map segments, in a data table for each of the memory blocks further includes registering information of map data for the memory block groups in the data table for each memory block group.

12. A memory system, comprising:
a plurality of memory blocks; and
a controller suitable for selecting among the memory blocks a source memory block having a least loading time of corresponding map data and a least scanning time of loaded map data, and controlling a garbage collection operation to the memory blocks with the selected source memory block by verifying validity of data stored in the selected source memory block and copying valid data to a target memory block,
wherein the controller determines the least loading time and the least scanning time based on a size of map data, a number of valid addresses included in the map data, and locality distribution of the valid addresses;
wherein the controller verifies the validity of the data by loading map segments of the selected source memory block and scanning the loaded map segments;
wherein the controller calculates the loading time and the scanning time based on a number of the map segments included in the map data of each of the memory blocks, a map segment list of the map segments, and the number of the valid addresses included in each of the map segments; and
wherein the map data, the map segments, and the valid addresses of the source memory block has a least size, and the source memory block has valid address distributions of a maximal locality distribution or continuity/sequence distribution.

* * * * *